(12) United States Patent
Wittke (10) Patent No.: US 11,750,894 B2
(45) Date of Patent: *Sep. 5, 2023

(54) SYSTEMS AND METHODS FOR RESUMING PLAYBACK ON A NEXT AVAILABLE ACTIVE DEVICE

(71) Applicant: Rovi Guides, Inc., San Jose, CA (US)

(72) Inventor: David Gerald Wittke, Simi Valley, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,643

(22) Filed: Sep. 19, 2022

(65) Prior Publication Data

US 2023/0156293 A1     May 18, 2023

Related U.S. Application Data

(63) Continuation of application No. 16/143,184, filed on Sep. 26, 2018, now Pat. No. 11,483,628.

(51) Int. Cl.
    *H04N 21/6587*     (2011.01)
    *H04N 21/433*     (2011.01)
    *H04N 21/436*     (2011.01)

(52) U.S. Cl.
    CPC ..... *H04N 21/6587* (2013.01); *H04N 21/4333* (2013.01); *H04N 21/43615* (2013.01)

(58) Field of Classification Search
None
See application file for complete search history.

(56) References Cited

U.S. PATENT DOCUMENTS

| | | | |
|---|---|---|---|
| 8,750,677 B2 | 6/2014 | Brown et al. | |
| 8,789,086 B2 | 7/2014 | McCoy et al. | |
| 8,942,549 B2 | 1/2015 | Duffin et al. | |
| 9,774,998 B1 | 9/2017 | Soyannwo et al. | |
| 10,028,023 B2 | 7/2018 | Glazier et al. | |
| 10,291,672 B2 * | 5/2019 | Jamal-Syed | G11B 27/10 |
| 11,483,628 B2 * | 10/2022 | Wittke | H04N 21/6587 |
| 2006/0153198 A1 | 7/2006 | Chadha | |
| 2011/0295974 A1 | 12/2011 | Kashef et al. | |
| 2014/0173447 A1 | 6/2014 | Das | |
| 2015/0215382 A1 | 7/2015 | Arora et al. | |
| 2016/0077710 A1 | 3/2016 | Lewis et al. | |

(Continued)

*Primary Examiner* — Junior O Mendoza
(74) *Attorney, Agent, or Firm* — HALEY GUILIANO LLP (57) ABSTRACT

Systems and methods are provided for automatically cueing content for playback on a second device after it is paused or stopped on a first device. A content direction device is in electronic communication with user devices and content providers. This content direction device directs streamed content from the content providers to the various user devices. When a user pauses or stops playback at a first device, the content direction device stops the stream. Later, when the user activates a second device, the content direction device detects the second device and directs the content provider to resume the stream, whereupon it is transmitted to the second device. In this manner, the user can pause or stop playback on one device, later activate another device, and automatically receive a cued stream of the previously paused/stopped content. No user input is required to open an application or window, or to re-select content.

20 Claims, 8 Drawing Sheets

(56) References Cited

U.S. PATENT DOCUMENTS

| | | |
|---|---|---|
| 2017/0003931 A1 | 1/2017 | Dvortsov et al. |
| 2019/0380021 A1 | 12/2019 | Meek et al. |
| 2020/0099995 A1 | 3/2020 | Wittke |

* cited by examiner

SYSTEMS AND METHODS FOR RESUMING PLAYBACK ON A NEXT AVAILABLE ACTIVE DEVICE

CROSS-REFERENCE TO RELATED APPLICATIONS

This application is a continuation of U.S. patent application Ser. No. 16/143,184, filed Sep. 26, 2018, which is hereby incorporated by reference herein in its entirety.

BACKGROUND

The wide availability of digital content has given users many avenues for consuming electronic content. As one example, centralized content playback services such as Netflix® and YouTube® allow consumers to select from and play back content from among large libraries of content. Often, content may also be provided from local storage sources, such as local hard drives.

SUMMARY

The availability of such content, and the large number of electronic devices available for its playback, mean that consumers may select and play desired content on several different screens. This allows users great flexibility in when and where they may view their content. For example, contemporary users can select desired content from a central service and watch different parts of it on different devices at different times. In particular, users may pause or stop content playback on one device, and resume it on a different device at a later time.

Limitations to this process still exist, however. Playback application interfaces still require users to visit the central service (e.g., through an application program), sign in, re-select the particular content they wish played back, and wait until playback begins. This can be an excessively long process that can lead to user frustration.

Accordingly, to overcome the problems and limitations of such services and their interfaces, systems and methods are described herein that automatically cue content on devices as they become available for playback. More specifically, a content direction device is placed between content consumption devices and content sources such as providers or locally stored content. The content consumption device itself may store this locally stored content. To the content providers, the content direction device appears effectively as a single content consumption device, receiving streamed content from content providers. The content direction device directs this content stream to a device the user activates, and receives and relays commands such as pause/stop commands. When the user device becomes active and able to receive a stream, the content direction device automatically either directs the content provider to resume the stream or resumes the stream from a local source, whereupon it is transmitted to the next device. In this manner, the user can pause or stop playback on one device, later activate another device, and automatically receive a cued stream of the previously paused/stopped content. No user input is required to open an application or window, or to re-select content. The later device can be, for example, the next device the user activates.

Content is transmitted from a content provider or local source to the content direction device, rather than directly to user devices. The content direction device forwards the content stream to user devices. Similarly, commands from the user devices are sent to the content direction device and are passed on to the content provider if necessary. Thus, when a user pauses or stops content playback on a first device, the content direction device receives a pause or stop command marking a consumption endpoint reached by the user. The content direction device then directs the content provider to pause or stop streaming of content.

Later, when the user seeks to resume playback on a different device, he or she may activate this different device, whereupon it transitions from a state in which it is unable to receive content, to a state in which it is able to receive content. For example, the device is turned on, boots up, and attaches to a local area network. The content direction device then detects the presence of this new user device on the local area network, or the user device transmits an indication to the content direction device that it is now active and able to receive content streams. In response, the content direction device instructs the content provider or local source to resume the content stream from the previous consumption endpoint, to extend sequentially to its end. The stream is then transmitted to the content direction device, where it is forwarded to the user device and cued there for playback by the user. Thus, users need simply to turn on a different device, and their content is automatically cued for playback.

The content direction device may optionally seek to close the current session at the content provider. For example, if a user issues a stop command and powers off his playback device, content providers may close the current session. Thus, in situations when the session should be closed, the content direction device may transmit a close session command to the content provider, to close the content provider's current streaming session. In this case, receiving an indication that a different device has been activated prompts the content direction device to transmit a resume session command to the content provider, to resume the content consumption session and continue streaming the content. Once the new stream is received, the content direction device then automatically directs the stream to the now-active user device.

The content direction device may alternatively not close the content provider's current session. As one example, if users attempt to resume playback at a different device very soon after shutting down their previous device, or after pausing rather than stopping content on the previous device, content providers may simply keep the same session open, and resume streaming from the same session. In this case, content streamed to the content direction device, and thus to the new user device, is streamed from the same session as before.

The content direction device may also seek to first authenticate new devices, to verify that they are permitted for content playback. Authentication is optional and need not necessarily be employed. But when employed, users may enter multiple device identifiers to the content direction device, corresponding to the list of devices which are allowed to receive content. Later, when the user seeks to resume content playback on another device, he or she activates the device, which transmits its own unique identifier to the content direction device. The content direction device compares this identifier to the stored list of device identifiers, and if it finds a match, content is streamed from the content provider to the new device.

It is known that many contemporary devices may exist in multiple different modes or states, including sleep modes, power-off states, and the like. Thus, for a user device to transition from a state in which it is unable to receive content to a state in which it is able to receive content, it may simply be powered on. That is, the aforementioned transition may simply be a transition from a power-off state to a power-on state. Alternatively, the transition may be a transition from a state in which the device has not coupled to a network, to one in which it has. This latter case may involve, for example, a waking from a sleep state. Still further, the transition may be a transition from a state in which a content consumption application program has not yet been automatically loaded, to one in which it has.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to a method of reducing user effort and wait time when resuming content playback on a different device. Content is automatically cued on the next device that becomes available for playback, without need for the user to open any windows, select any applications, or the like. As one example, a user may choose to watch an episode of a show on Netflix®, on the television (TV) in his home. The user may pause or stop playback of the episode, and perhaps shut off the TV. Sometime later, the user may turn on another content playback device, such as a laptop or phone, whereupon the episode is automatically cued on that device for immediate playback from the point at which the content was last paused or stopped. In this manner, resumption of content playback is shorter and easier, leading to less user frustration and greater content engagement.

Figure 1:
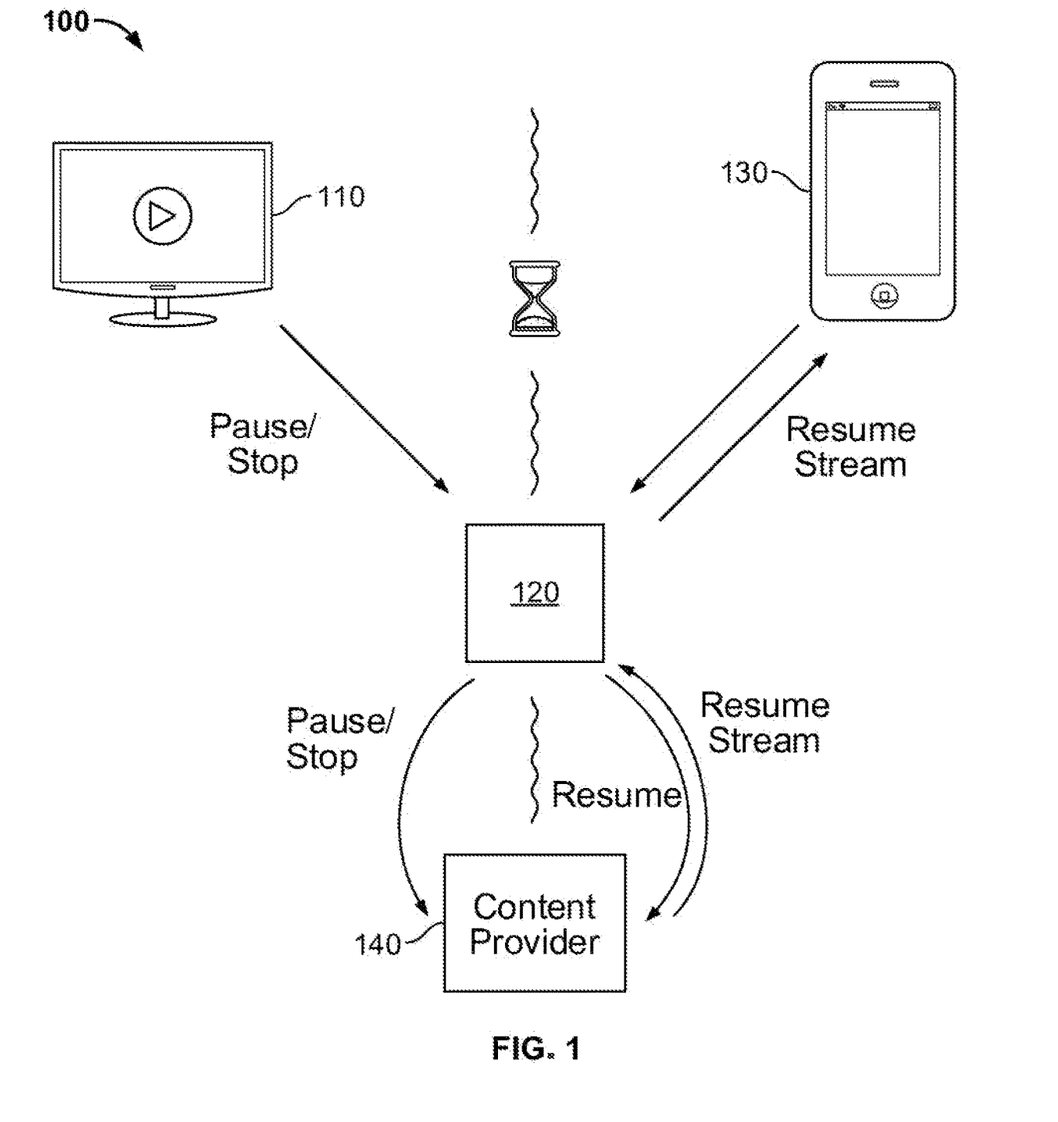
FIG. 1 shows an exemplary system for resuming content playback on different devices, in accordance with embodiments of the disclosure.

FIG. 1 shows an exemplary system for resuming content playback on different devices, in accordance with embodiments of the disclosure. System 100 includes a first content consumption device 110, a content direction device 120, and a second content consumption device 130. First and second content consumption devices 110, 130 communicate with content direction device 120, which receives and forwards content streamed from content provider 140. In other words, content direction device 120 receives content from content provider 140 and transmits it on to the content consumption device 110, 130 currently used by a user.

In operation of system 100, a user may be watching, for example, a Netflix® show on first content consumption device 110, which may be his home TV. The show is streamed from the content provider 140, e.g., a Netflix® server, to content direction device 120, which in turn transmits the stream to the user's home TV. At some point, the user may pause or stop playback, perhaps even turning off the device 110. The device 110 then transmits a consumption endpoint, corresponding to the point in the content at which playback was paused/stopped, to the content direction device 120, which forwards the consumption endpoint to the content provider 140 along with a pause/stop command.

Some time later, the user turns on his cellular phone, which may be second content consumption device 130. When the content direction device 120 detects the second content consumption device 130 (as described further below) and determines that it is able to receive streamed content, the content direction device 120 instructs the content provider 140 to resume streaming the Netflix® show. The resulting stream is received and routed to the second content consumption device 130, where device 130 automatically cues it for playback. In this manner, the user may pause or stop content playback on a first content consumption device 110 and resume it later at a second content consumption device 130. Content is automatically cued at content consumption device 130 when the device is turned on and becomes able to receive a content stream, thus presenting content to the user faster, reducing wait time, and eliminating the need for the user to manually open applications or select content.

Figure 2:
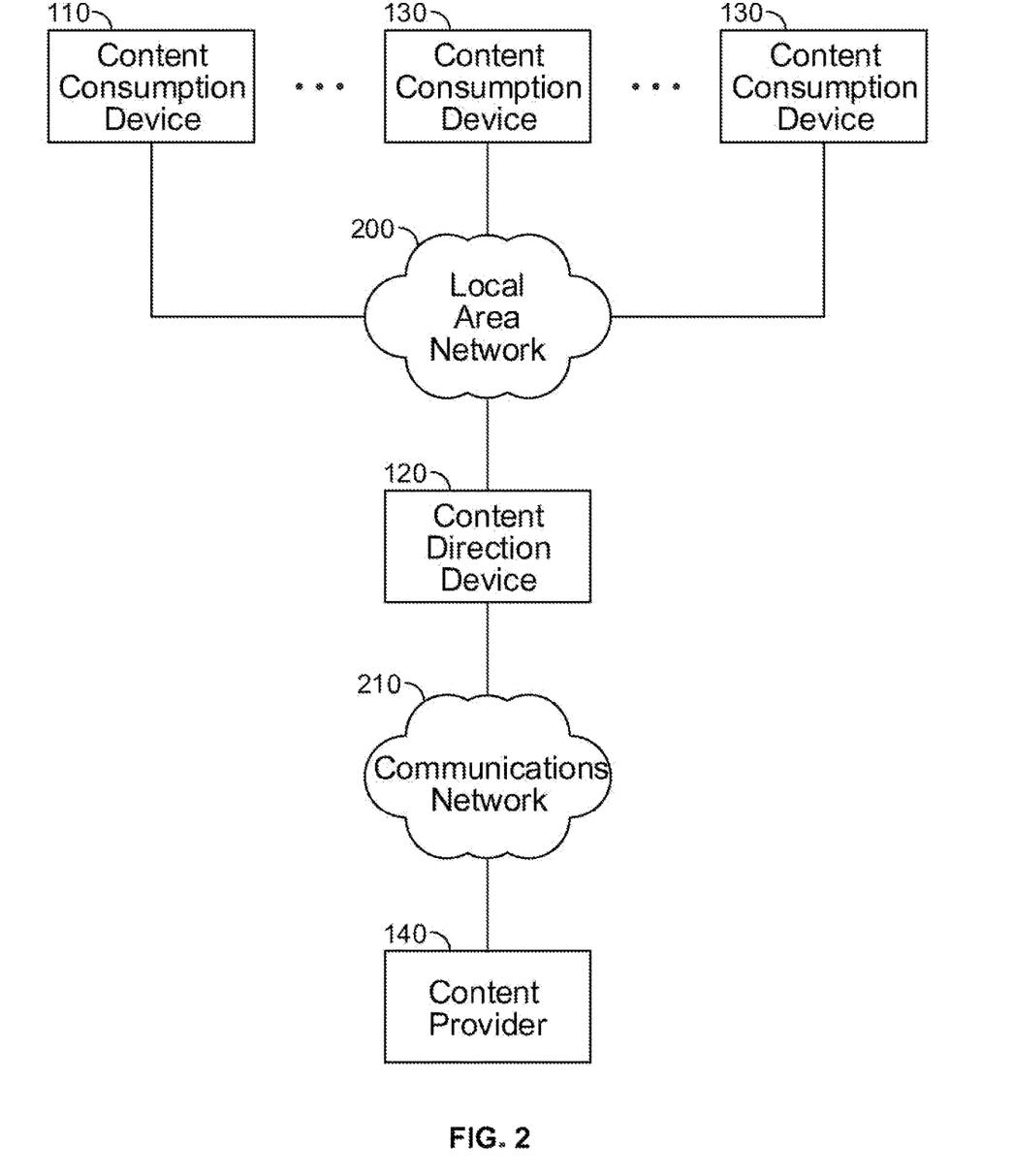
FIG. 2 is a block diagram illustration of the system of FIG. 1.

FIG. 2 is a block diagram representation of the system of FIG. 1, presented for further illustration. Any number of content consumption devices 110 and 130 may be in communication with content direction device 120 through, for example, a local area network 200. The content direction device 120 is in electronic communication with content provider 140 through communications network 210. As one example, the content consumption devices 110 and 130, local area network 200, and content direction device 120 may all be situated within a local area, e.g., within various rooms of a home or office. The content provider 140 may be a remotely located server at a content provider site, and the communications network 210 may be the public Internet. Alternatively, the content provider 140 may be situated within the local area and may be, for example, a local content storage and streaming application on a local computer including any of the above computing devices, or even a storage and application within the content direction device 120 itself.

As above, a user may be watching a show on first content consumption device 110, at which point the content provider 140 is providing a stream of the show through communications network 210 to content direction device 120. The content direction device 120 in turn receives this stream and directs it to device 110 over local area network 200. When the user pauses or stops playback, a pause/stop command is issued back through local area network 200 to content direction device 120, where it is forwarded to content provider 140 (through communications network 210). A consumption endpoint, indicating the point at which playback was halted, may be issued along with the stop/pause command.

Later, when the user activates another device such as one of the content consumption devices 130, the content direction device 120 detects that device 130 has coupled to the local area network 200 and automatically sends a resume command to content provider 140 via communications network 210. Content provider 140 resumes the stream from the previous consumption endpoint, transmitting it to content direction device 120. The content direction device 120 then transmits the stream to device 130, which cues it for playback to the user.

Figure 3:
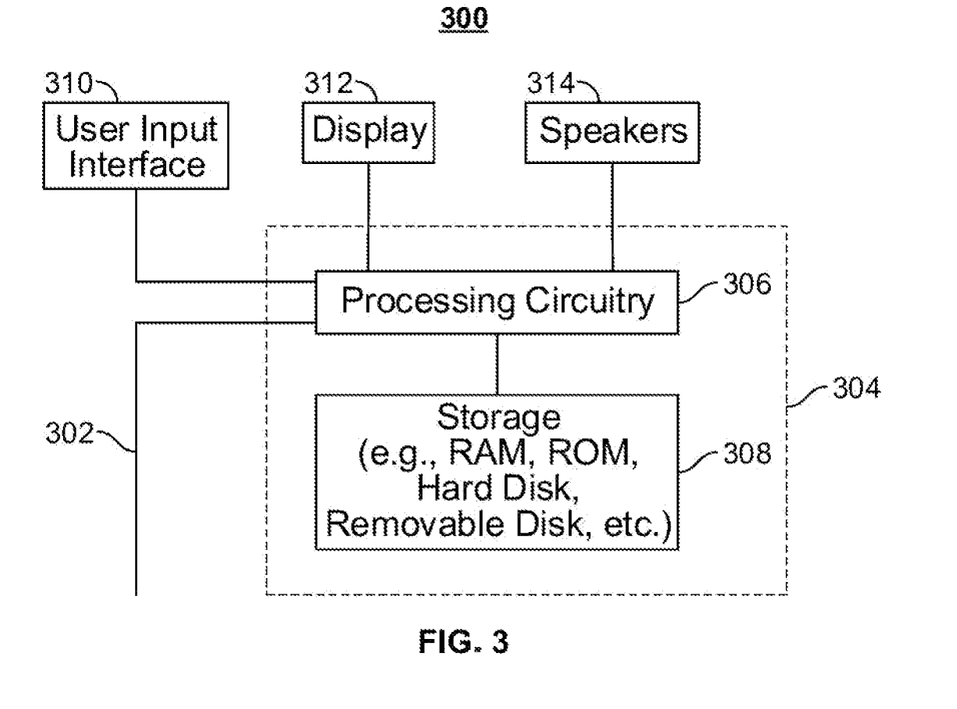
FIG. 3 is a generalized embodiment of illustrative content consumption devices constructed for use according to embodiments of the disclosure.

The content consumption devices 110, 130 may be any devices capable of receiving streamed content and executing playback for users. For example, content consumption devices 110, 130 may be digital TVs, laptop computers, smartphones, tablet computers, or the like. FIG. 3 shows a generalized embodiment of an illustrative user equipment device 300 that may serve as a content consumption device. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing playback, such as executing application programs that provide interfaces for content providers 140 to stream and display content.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
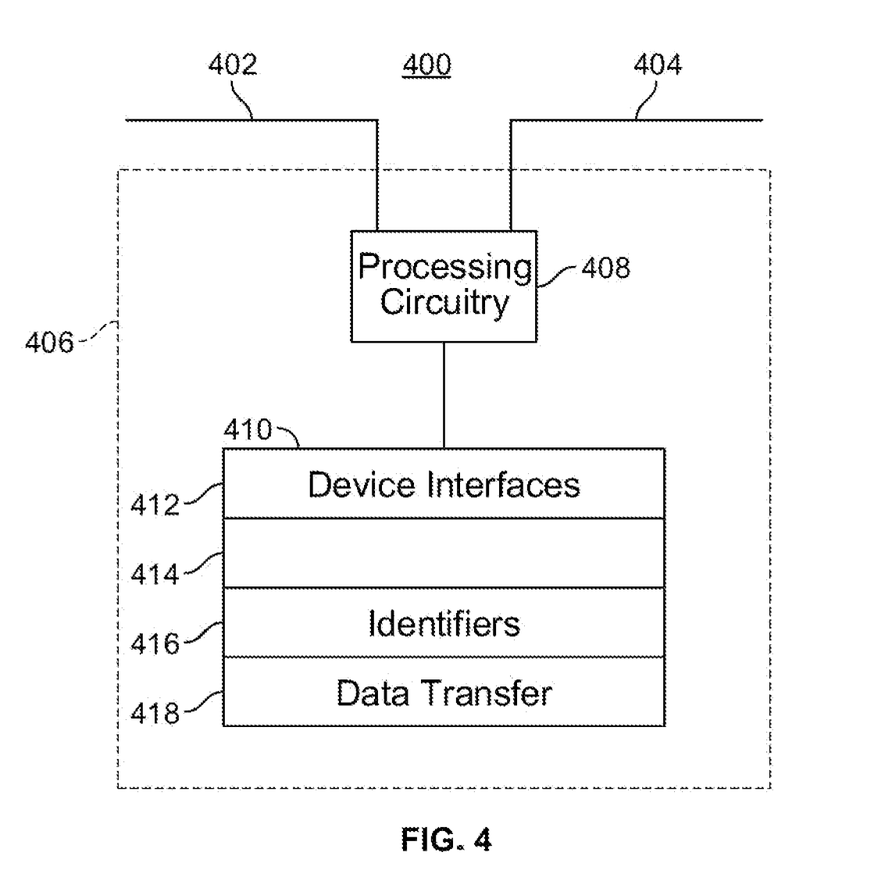
FIG. 4 is a generalized embodiment of an illustrative content direction device constructed for use according to embodiments of the disclosure.

FIG. 4 is a generalized embodiment of an illustrative content direction device 120 constructed for use according to embodiments of the disclosure. Here, device 400 may serve as a content direction device. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, similar to the respective components of user equipment device 300.

Storage 410 is a memory that stores a number of programs for execution by processing circuitry 408. In particular, storage 410 may store a number of device interfaces 412, content provider interfaces 414, device identifiers 416, and data transfer routines 418. The device interfaces 412 are interface programs for handling the exchange of commands and data with the various content consumption devices 110, 130. Content provider interfaces 414 are interface programs for handling the exchange of commands and content streams with various content providers 140, and are programmed to exchange commands and content similar to a corresponding application program on a content consumption device 110, 130. A separate interface 414 may exist for each different content provider 140 that has its own format for commands or content. Data transfer module 418 handles routing of content streams from the content providers 140 to the appropriate content consumption devices 110, 130. That is, module 418 contains routines for redirecting content streams received from content providers 140 to specific content consumption devices 110, 130. If content is stored within device 400 itself, it may be stored in storage 410 along with an application program that streams the stored content to a destination specified as below.

The device 400 may be any electronic device capable of receiving content streams and transferring them to one or more content consumption devices 110, 130. For example, the device 400 may be a networked in-home smart device connected between a home modem and various content consumption devices 110, 130. The device 400 may alternatively be a laptop computer or desktop computer configured as above. As such, one of ordinary skill in the art will recognize that the device 400 may be any one of the content consumption devices 110, 130 or some portion thereof.

Figure 5:
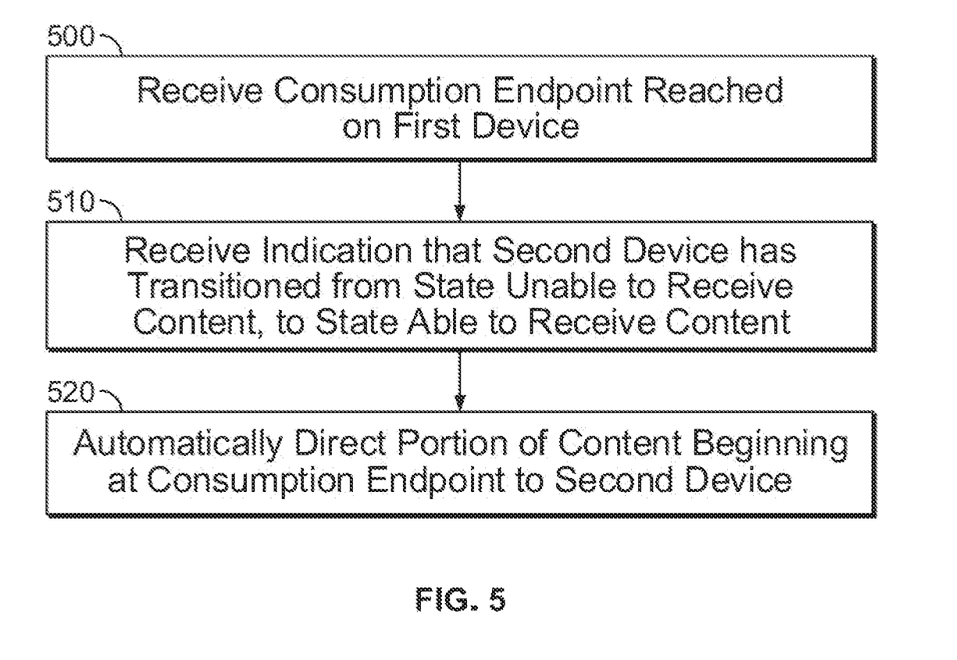
FIG. 5 is a flowchart illustrating an exemplary content resumption process according to embodiments of the disclosure.

Operation of the system of FIG. 2 is now described in connection with FIG. 5, which is a flowchart illustrating an exemplary content resumption process according to embodiments of the disclosure. A user may be consuming content on consumption device 110. At this point, the content provider 140 is streaming the content to content direction device 120 through communications network 210, and the content direction device 120 is in turn forwarding the stream to device 110 through local area network 200. The content consumption device 110 may be displaying the content through an application program loaded from its storage 308.

At some point, the user wishes to pause or stop playback from his device 110. The user may, for example, press a pause or stop button on a remote control, or if the device 110 has a touch screen, the user may press a pause icon on the screen. The device 110 then transmits a pause/stop command to content direction device 120 along with a consumption endpoint, i.e. the point within the content at which playback was halted. The content direction device 120 receives the command and endpoint (Step 500), and transmits both the pause/stop command and the consumption endpoint to the content provider 140. In response, the content provider 140 halts the stream, and may close the current session.

While Step 500 describes receiving a separate consumption endpoint and pause/stop command, it is noted that the pause/stop command may also act as a consumption endpoint. That is, the device 110 may send a single command to pause or stop, and the content direction device 120 may determine the consumption endpoint as the point in the content that was reached when the pause/stop command was received. Alternatively, the content direction device 120 may simply receive and relay the pause/stop command without any consumption endpoint, and the content provider 140 may determine the consumption endpoint itself.

At some later point, the user may wish to resume playback of the content on a different content consumption device 130, whereupon the user may activate device 130 by, e.g., turning it on, waking it from sleep mode, or the like. When the device 130 activates and attaches to local area network 200, the content direction device 120 receives an indication that device 130 has attached and is thus able to receive content. That is, the content direction device 120 receives an indication that device 130 has transitioned from a state in which it was unable to receive content over local area network 200, to a state in which it is now able to receive content (Step 510).

Content direction device 120 may be made aware of device 130 in any number of ways. In one embodiment, device 130 may transmit an indicator to content direction device 120 once it attaches to local area network 200. The indicator may be transmitted by an application program once it is automatically loaded, as further described below. Alternatively, the content direction device 120 may scan the local area network 200 for new devices, detecting device 130 when it attaches. Any method of making content direction device 120 aware of the presence of device 130 on local area network 200 may be employed.

Figure 6:
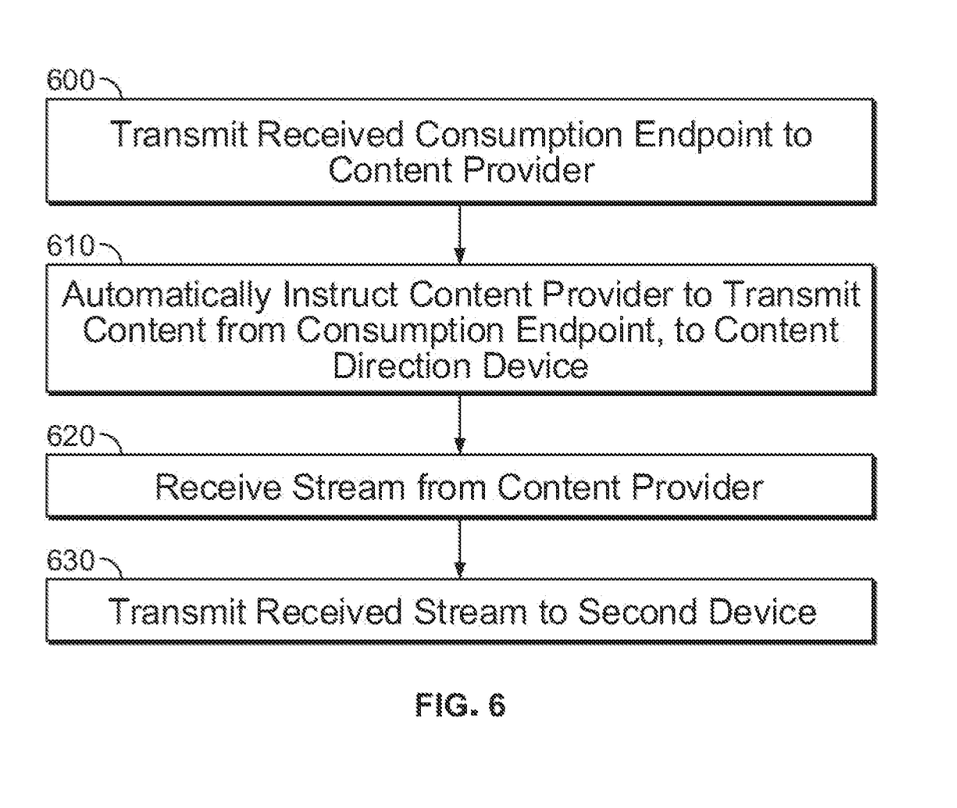
FIG. 6 is a flowchart illustrating further details of aspects of the exemplary content resumption process of FIG. 5.

Once content direction device 120 receives this indication, it automatically initiates the process of resuming the content stream at the content consumption device 130, i.e. directing the portion of the content beginning at the consumption endpoint, to the content consumption device 130 (Step 520). FIG. 6 illustrates further details of Step 520. In particular, content direction device 120 automatically opens or resumes a session with the content provider 140, selects the content, transmits the previously-received consumption endpoint to the content provider 140 (Step 600) and instructs the content provider 140 to begin streaming the content beginning at the consumption endpoint (Step 602). In some embodiments, the content provider 140 retains the consumption endpoint it received or determined when the user previously paused/stopped the content. In this case, Step 600 may be omitted and the content direction device 120 may simply instruct the content provider 140 to resume streaming. In other embodiments, streaming may resume from a point near but not precisely at the previous endpoint, e.g., a point within a range of several seconds of the consumption endpoint. Any range is contemplated.

In response to receiving the instruction to resume streaming, the content provider 140 transmits the stream through communications network 210 to be received at content direction device 120 (Step 620). The content direction device 120 then transmits this received stream to content consumption device 130 (Step 630). The content consumption device 130 then cues the streamed content for playback when the user desires.

Figure 7:
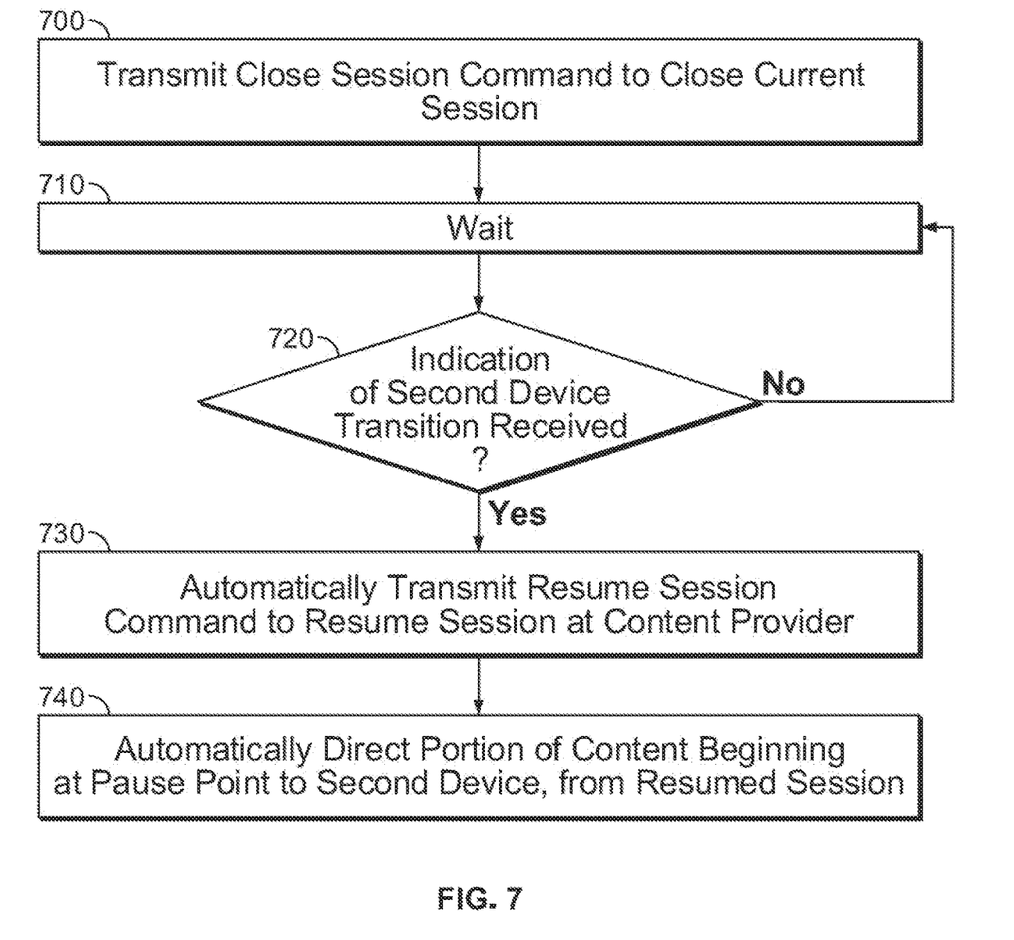
FIG. 7 is a flowchart illustrating content consumption session closure and resumption within the exemplary content resumption process of FIG. 5.

As described above in connection with Step 500 of FIG. 5, content providers 140 may close paused or stopped sessions. Such closings may be performed automatically after a predetermined duration of inactivity, for instance. Alternatively, either content consumption device 110 or content direction device 120 may instruct the content provider 140 to close the current session, such as in the case that the content consumption device 110 is turned off. In such cases, embodiments of the disclosure resume sessions when content consumption device 130 becomes available for resuming streaming. FIG. 7 illustrates in further detail processes undertaken by content direction device 120 in resuming sessions at a content provider 140. In cases where users desire to close their current session, the content direction device 120 may transmit a close session command to content provider 140, to close the current session (Step 700). This step may be omitted if the user does not send a close session command. Instead, the content provider 140 may simply close the current session automatically. Alternatively, the content provider 140 may be left to close the session itself, for example after a predetermined period of inactivity.

Content direction device 120 and content provider 140 then wait (Step 710) until the content direction device 120 detects that the content consumption device 130 has attached to the local area network 200 (Step 720), whereupon content direction device 120 automatically transmits a resume session command to the content provider 140 (Step 730). In response, the content provider 140 resumes the session. Content direction device 120 selects the interrupted content and instructs the content provider 140 to resume the stream from the previous streaming endpoint, whereupon the content provider 140 transmits the stream to content direction device 120. The content direction device 120 then automatically directs the stream to content consumption device 130 for cueing and playback (Step 740).

Figure 8:
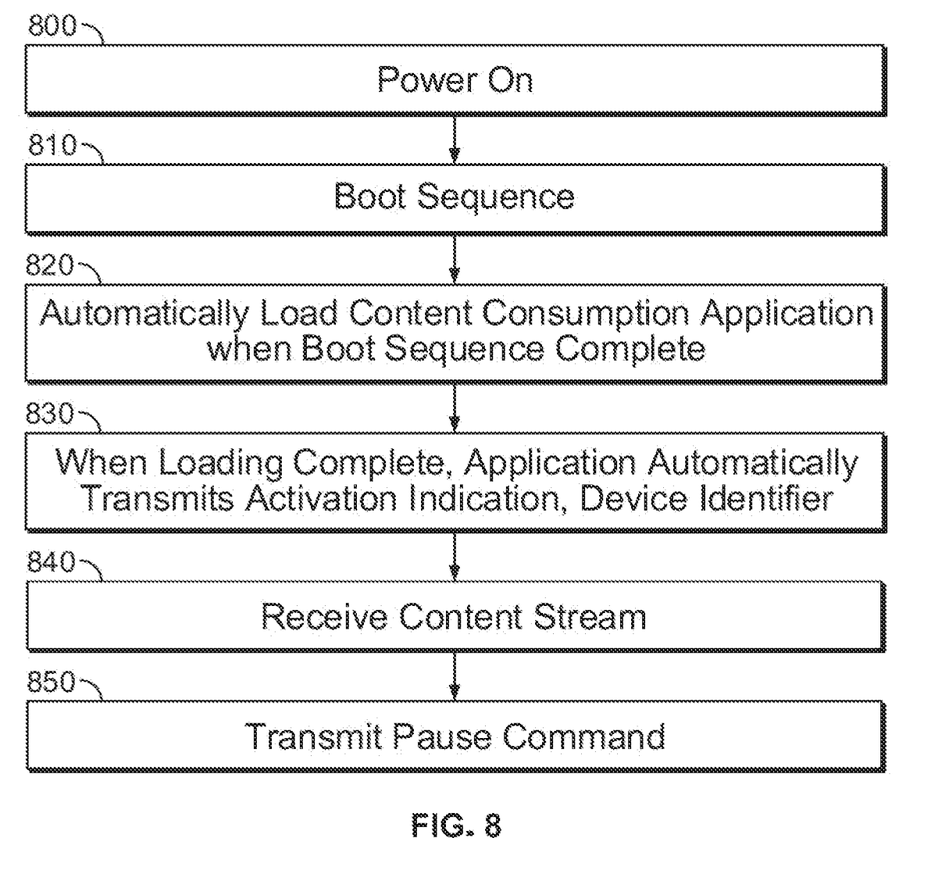
FIG. 8 is a flowchart illustrating content consumption device operation when cueing content according to embodiments of the disclosure.

FIG. 8 is a flowchart illustrating further details of operation of content consumption device 130 when cueing content according to embodiments of the disclosure. As above, content is automatically streamed to content consumption device 130 when it becomes able to receive content. In further detail, as soon as the user turns on or otherwise activates content consumption device 130 (Step 800), the device 130 executes its boot sequence (Step 810). If the device 130 is in sleep mode or some other mode in which it remains powered on but unable to receive or display streamed content, this step may be omitted, and a wake-up or other similar sequence may be performed instead.

The device 130 then automatically loads a content consumption application allowing it to display the streamed content (Step 820). This application may, for example, be a Netflix® application, or any other application program for playback of content from a particular service. Once the application is loaded, it is programmed to automatically transmit an activation indication and device identifier to the content direction device 120 (Step 830). This informs the content direction device 120 of the presence of device 130 on the local area network 200, and identifies the device 130 for authentication purposes. Authentication is described further below in connection with FIG. 9.

Authentication is optional in the various embodiments of the disclosure and may be omitted. But after authentication (if it is employed), the content direction device 120 instructs the content provider 140 to resume streaming the particular content, which is streamed to the content direction device 120. The content direction device 120 forwards the stream to the loaded application of content consumption device 130, which receives it (Step 840) and cues the content for consumption by the user. The application may then transmit a pause command to the content direction device 120 (Step 850), so that content playback is paused rather than resumed immediately. This allows the user to resume playback when he or she is ready, rather than being forced to watch resumed content immediately upon activating content consumption device 130. As with authentication, Step 850 is optional and may be omitted in embodiments in which it is desired to resume playback immediately upon activation of content consumption device 130.

Figure 9:
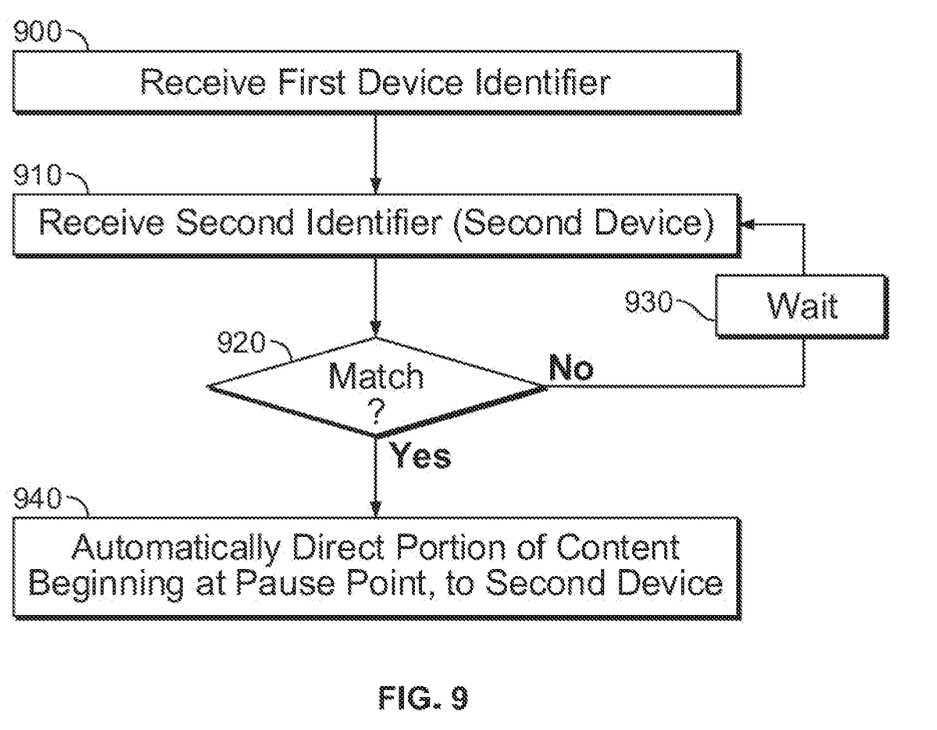
FIG. 9 is a flowchart illustrating an exemplary device authentication process for use with the content resumption process of FIG. 5.

The optional authentication process is now described in connection with FIG. 9, which is a flowchart illustrating further details of an exemplary such process. It may be desirable to confirm the identity of devices 130 that join local area network 200, to ensure that they are authorized to play back content. For example, certain services may allow playback only on devices the user has paid for. As another example, the user may wish to allow playback only on devices he or she owns, and not any other devices that may join local area network 200.

Prior to viewing content, the content direction device 120 may prompt the user to identify those devices that are authorized for content playback. The user enters this information, and it is received at content direction device 120 (Step 900). The entered information may be unique device identifiers such as internet protocol (IP) addresses, passwords unique to each device, or the like.

At a later time, the user may wish to resume playback on a particular device, as above. Accordingly, when content consumption device 130 attaches to local area network 200 and transmits its unique identifier to content direction device 120 as in Step 830 above, the identifier is received at content direction device 120 (Step 910). The content direction device 120 compares this identifier to the identifiers previously received in Step 900 (Step 920). If a match is not found, the content consumption device 130 is not authorized to stream content from content provider 140. The content direction device 120 thus ignores content consumption device 130 and waits for another device to attach to the local area network 200 (Step 930). However, if a match is found, the content direction device 120 automatically instructs the content provider 140 to resume the content stream beginning at the previous pause or stop point. Once received, the stream is then forwarded to content consumption device 130

(Step 940). Steps 910 and 920 may occur between Steps 510 and 520 of FIG. 5, and Step 940 may correspond to Step 520 of FIG. 5. That is, the content direction device 120 may authenticate content consumption devices 130 as they appear on the local area network 200, and successful authentication initiates the process of cueing content at content consumption devices 130.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, content playback may be paused and resumed on any user device, at any time. Consumption endpoints may be forwarded by device 120, or determined by either one of device 120 or content provider 140. Content direction device 120 may determine the presence of a device 130 by automatically detecting a new device on its local area network, or receiving an indicator from the new device. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A computer-implemented method, comprising:
receiving, at a content direction device via a local area network (LAN) from a first computing device providing content, an indication associated with the content;
detecting, at the content direction device, the presence of a second computing device as a new device on the LAN by determining that the second computing device has transitioned from a state in which the second computing device was not coupled to the LAN and therefore was unable to receive the content via the LAN, to a state in which the second computing device is coupled to the LAN and therefore is able to receive the content via the LAN; and
in response to detecting the presence of the second computing device as a new computing device on the LAN, causing the indication associated with the content to be transmitted to the second computing device.

2. The method of claim 1, wherein:
the indication associated with the content comprises a consumption endpoint reached during consumption of the content at the first computing device; and
causing the indication to be transmitted to the second computing device comprises directing, by the content direction device, a portion of the content to the second computing device, the portion of the content beginning within a range of the consumption endpoint.

3. The method of claim 2, wherein the consumption endpoint is a point in the content at which consumption of the content was paused or stopped.

4. The method of claim 2, wherein the content direction device is configured to direct the portion of the content to the second computing device by receiving a stream of the portion of the content and transmitting the received stream to the second computing device.

5. The method of claim 1, wherein causing the indication associated with the content to be transmitted to the second computing device comprises the content direction device instructing a content provider to transmit the indication to the second computing device.

6. The method of claim 1, further comprising:
receiving, at the content direction device, an instruction to resume consumption of content on a next computing detected as the new device on the LAN; and
causing the indication associated with the content to be transmitted to the second computing device based at least in part on the received instruction.

7. The method of claim 1, wherein the content direction device automatically directs the content to the second computing device, and the consumption of the content on the first computing device occurs during the same content consumption session at a content provider.

8. The method of claim 1, further comprising:
receiving a first identifier identifying a computing device configured to provide the content for consumption;
receiving a second identifier corresponding to the second computing device;
determining whether the first identifier matches the second identifier; and
causing the indication associated with the content to be transmitted to the second computing device is further based on determining the first identifier matches the second identifier.

9. The method of claim 1:
wherein the state in which the second computing device is unable to receive the content is further associated with a power-off state of the second computing device; and
wherein the state in which the second computing device is able to receive the content is further associated with a power-on state of the second computing device.

10. The method of claim 1:
wherein the state in which the second computing device is unable to receive the content is further associated with a state in which the second computing device has not yet automatically loaded a content consumption application program usable to consume the content; and
wherein the state in which the second computing device is able to receive the content is further associated with a state in which the second computing device has automatically loaded the content consumption application program usable to consume the content.

11. A computer-implemented system, comprising:
memory;
control circuitry configured to:
receive, at a content direction device via a local area network (LAN) from a first computing device providing content, an indication associated with the content, wherein the indication is stored in the memory;
detect, at the content direction device, the presence of a second computing device as a new device on the LAN by determining that the second computing device has transitioned from a state in which the second computing device was not coupled to the LAN and therefore was unable to receive the content via the LAN, to a state in which the second computing device is coupled to the LAN and therefore is able to receive the content via the LAN; and in response to detecting the presence of the second computing device as a new computing device on the LAN, cause the indication associated with the content to be transmitted to the second computing device.

12. The system of claim 11, wherein:
the indication associated with the content comprises a consumption endpoint reached during consumption of the content at the first computing device; and
the control circuitry is configured to cause the indication to be transmitted to the second computing device by directing, by the content direction device, a portion of the content to the second computing device, the portion of the content beginning within a range of the consumption endpoint.

13. The system of claim 12, wherein the consumption endpoint is a point in the content at which consumption of the content was paused or stopped.

14. The system of claim 12, wherein the content direction device is configured to direct the portion of the content to the second computing device by receiving a stream of the portion of the content and transmitting the received stream to the second computing device.

15. The system of claim 11, wherein the control circuitry is configured to cause the indication associated with the content to be transmitted to the second computing device by the content direction device instructing a content provider to transmit the indication to the second computing device.

16. The system of claim 11, wherein the control circuitry is configured to:
receive, at the content direction device, an instruction to resume consumption of content on a next computing detected as the new device on the LAN; and
cause the indication associated with the content to be transmitted to the second computing device based at least in part on the received instruction.

17. The system of claim 11, wherein the content direction device automatically directs the content to the second computing device, and the consumption of the content on the first computing device occurs during the same content consumption session at a content provider.

18. The system of claim 11, wherein the control circuitry is configured to:
receive a first identifier identifying a computing device configured to provide the content for consumption;
receive a second identifier corresponding to the second computing device; and determine whether the first identifier matches the second identifier; and
cause the indication associated with the content to be transmitted to the second computing device further based on determining the first identifier matches the second identifier.

19. The system of claim 11:
wherein the state in which the second computing device is unable to receive the content is further associated with a power-off state of the second computing device; and
wherein the state in which the second computing device is able to receive the content is further associated with a power-on state of the second computing device.

20. The system of claim 11:
wherein the state in which the second computing device is unable to receive the content is further associated with a state in which the second computing device has not yet automatically loaded a content consumption application program usable to consume the content; and
wherein the state in which the second computing device is able to receive the content is further associated with a state in which the second computing device has automatically loaded the content consumption application program usable to consume the content.

* * * * *